United States Patent [19]
Yoshida

[11] Patent Number: 5,754,906
[45] Date of Patent: May 19, 1998

[54] PHOTOGRAPHIC CAMERA WITH BARRIER

[75] Inventor: Toshio Yoshida, Saitama-ken, Japan

[73] Assignee: Fuji Photo Optical Co., Ltd., Saitama-ken, Japan

[21] Appl. No.: 686,356

[22] Filed: Jul. 25, 1996

[30] Foreign Application Priority Data

Aug. 1, 1995 [JP] Japan ................ 7-196620

[51] Int. Cl.$^6$ ............................................. G03B 17/00
[52] U.S. Cl. ............................................. 396/448
[58] Field of Search .................. 354/288, 286, 354/227.1; 396/448, 6

[56] References Cited

U.S. PATENT DOCUMENTS

| | | | |
|---|---|---|---|
| 4,961,084 | 10/1990 | Komatsuzaki et al. | 354/268 |
| 5,063,400 | 11/1991 | Takei et al. | 354/288 |
| 5,079,576 | 1/1992 | Kodaira | 354/212 |
| 5,184,169 | 2/1993 | Nishitani | 354/412 |
| 5,537,176 | 7/1996 | Hara et al. | 354/288 |
| 5,543,876 | 8/1996 | Suzuki et al. | 354/149.11 |
| 5,555,062 | 9/1996 | Pearson et al. | 354/288 |

*Primary Examiner*—Safet Metjahic
*Assistant Examiner*—Christopher E. Mahoney
*Attorney, Agent, or Firm*—Sixbey Friedman Leedom & Ferguson; Gerald J. Ferguson, Jr.; Evan R. Smith

[57] ABSTRACT

A photographic camera has a barrier which is disposed between the camera body and a decorative front cover to be movable between a closing position where it covers a taking lens of the camera and an opening position where it opens the taking lens through an opening formed in the front cover. The barrier is provided with an opening which is brought into alignment with the taking lens and the opening in the front cover when the barrier is moved to the opening position and has a smaller diameter than the opening in the front cover. An anti-flare pattern of recessed portions and protruded portions is formed on the outer surface of the barrier around the opening.

15 Claims, 7 Drawing Sheets

F I G.1
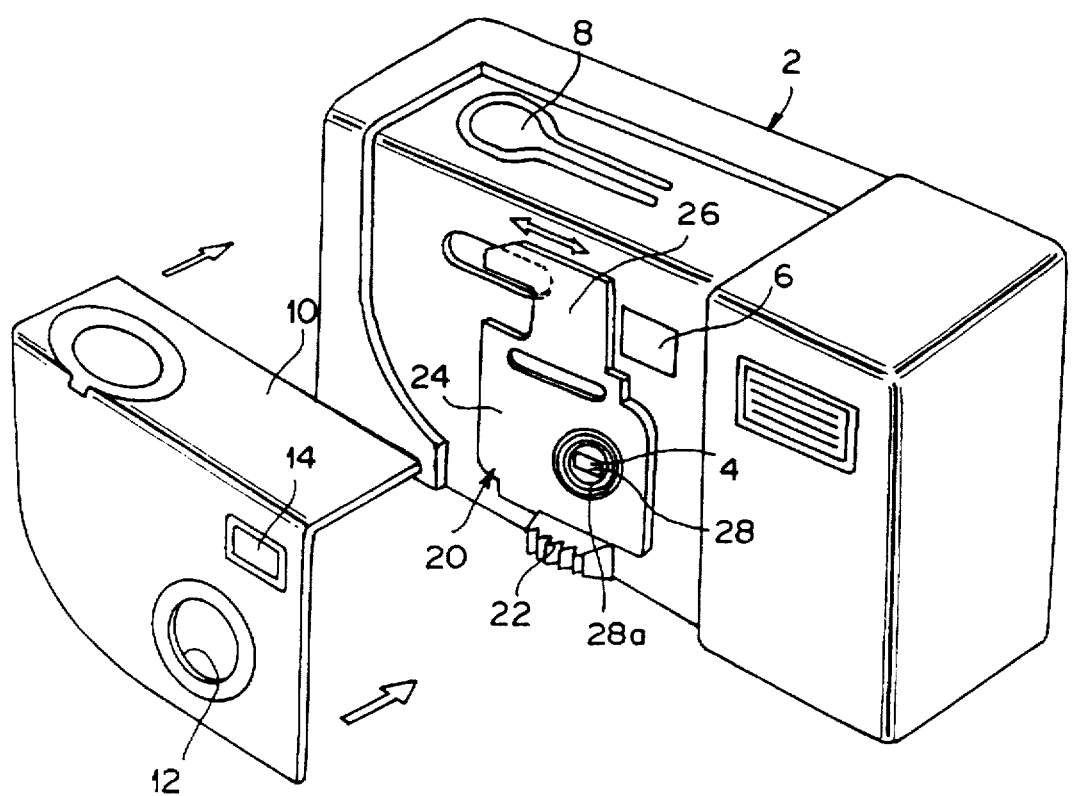

PHOTOGRAPHIC CAMERA WITH BARRIER

BACKGROUND OF THE INVENTION

1. Field of the Invention

This invention relates to a photographic camera having a barrier which is disposed between the camera body and a decorative front cover to be movable between a closing position where it covers the taking lens and an opening position where it opens the taking lens, and more particularly to the structure of such a barrier.

2. Description of the Related Art

There has been known a photographic camera having a barrier which is disposed between the camera body and a decorative front cover to be movable between a closing position where it covers the taking lens and an opening position where it opens the taking lens. The barrier is a plate-like member which is slid into and away from the optical path to the taking lens and the viewfinder.

In such a camera, the front cover is provided with an opening to provide a sufficiently wide optical path to the taking lens and a space for accommodating the barrier is provided between the front cover and the camera body. Accordingly when the barrier is in the opening position, a large gap is formed between the opening in the front cover and the camera body and incident light traveling through the opening impinges upon and reflected at various parts in the gap, which can cause flare.

SUMMARY OF THE INVENTION

In view of the foregoing observations and description, the primary object of the present invention is to provide a photographic camera with barrier in which flare cannot be caused when the barrier is in the opening position.

The photographic camera with barrier in accordance with the present invention is characterized in that the barrier is provided with an opening which is brought into alignment with the optical path to the taking lens when the barrier is moved to the opening position and has a smaller diameter than the opening in the front cover and an anti-flare pattern of recessed portions and protruded portions is formed on the outer surface of the barrier around the opening.

It is preferred that the inner diameter of the opening in the barrier increases toward the taking lens, that is, the opening flares toward the taking lens.

In the camera of the present invention, the barrier can function as a lens hood by virtue of the opening formed therein which is smaller than opening in the front cover and the anti-flare pattern around the opening which reflects outward a peripheral portion of light entering through the opening in the front cover.

BRIEF DESCRIPTION OF THE DRAWINGS

FIG. 1 is an exploded perspective view of a photographic camera in accordance with an embodiment of the present invention.

DESCRIPTION OF THE PREFERRED EMBODIMENT

Figure 2:
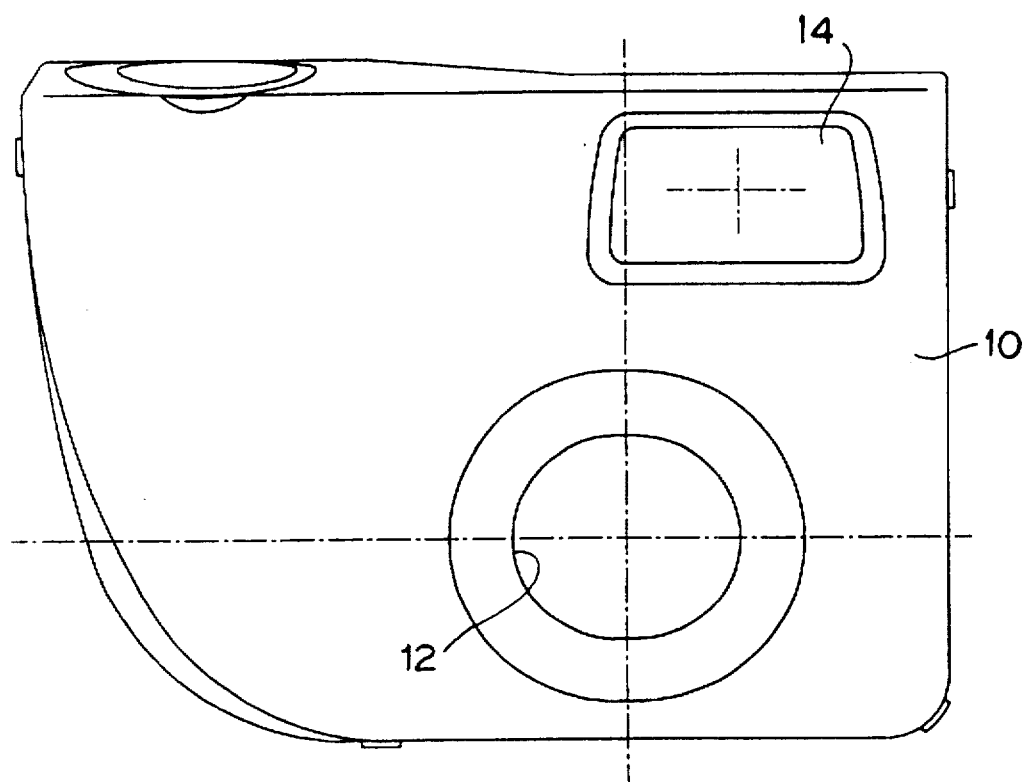
FIG. 2 is a front view showing the decorative front cover of the camera.

In FIG. 1, a camera in accordance with an embodiment of the present invention has a decorative front cover 10 mounted on the front face of a camera body 2. A barrier 20 is supported between the camera body 2 and the front cover 10 for sliding motion left and right. A knob 22 formed on the lower edge of the barrier 20 projects forward of the lower edge of the front cover 10 (FIGS. 4 to 6) so that the barrier 20 can be manually opened and closed from the front side of the camera body 2. The front cover 10 is provided with a relatively large opening 12 in alignment with a taking lens 4 on the camera body 2 and a relatively small opening in alignment with a viewfinder 6 on the camera body 2. The barrier 20 comprises first and second portions 24 and 26 which respectively cover the taking lens 4 and the viewfinder 6 when the barrier 20 is in the closing position. The barrier 20 is further provided with an opening 28 which is in alignment with the taking lens 4 when the barrier 20 is in the opening position and is smaller than the opening 12 in the front cover 10. The portion of the barrier 20 which is aligned with the viewfinder 6 when the barrier 20 is in the opening position is cut away. A shutter release button 8 is disposed on the upper surface of the camera body 2.

Figure 3:
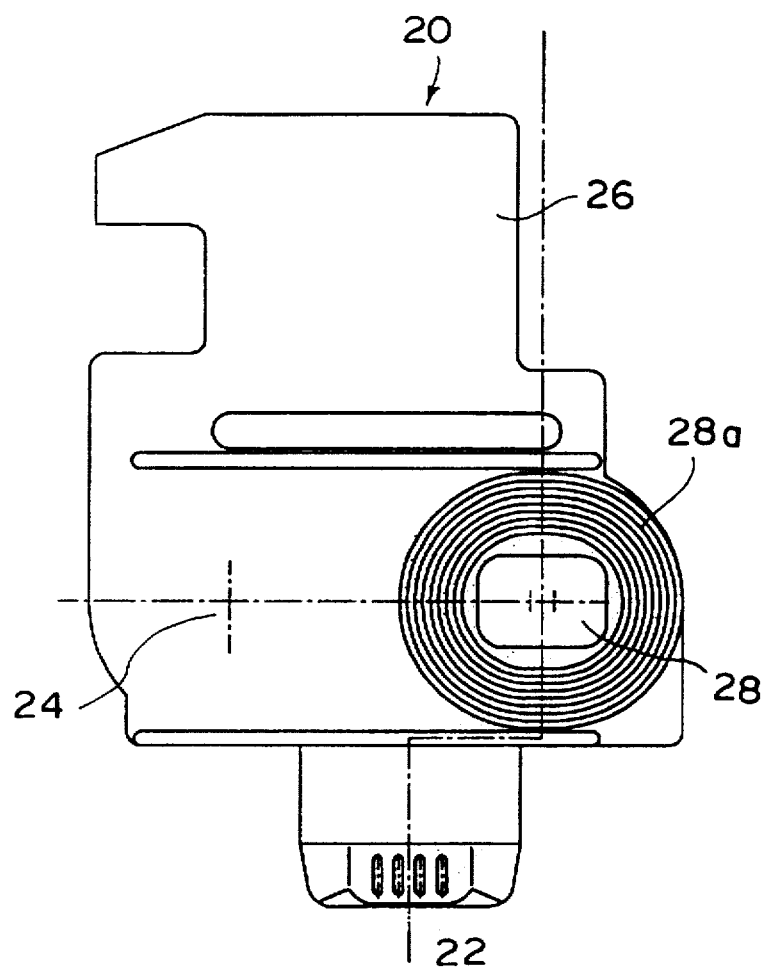
FIG. 3 is a front view showing the barrier of the camera.

The barrier 20 is provided with an anti-flare pattern 28a of recessed portions and protruded portions formed on the outer surface of the barrier 20 around the opening 28. In this particular embodiment of the present invention, the anti-flare pattern 28a comprises a plurality of annular recesses and a plurality of annular protrusions formed concentrically with the opening 28 as best shown in FIG. 3.

Figure 4:
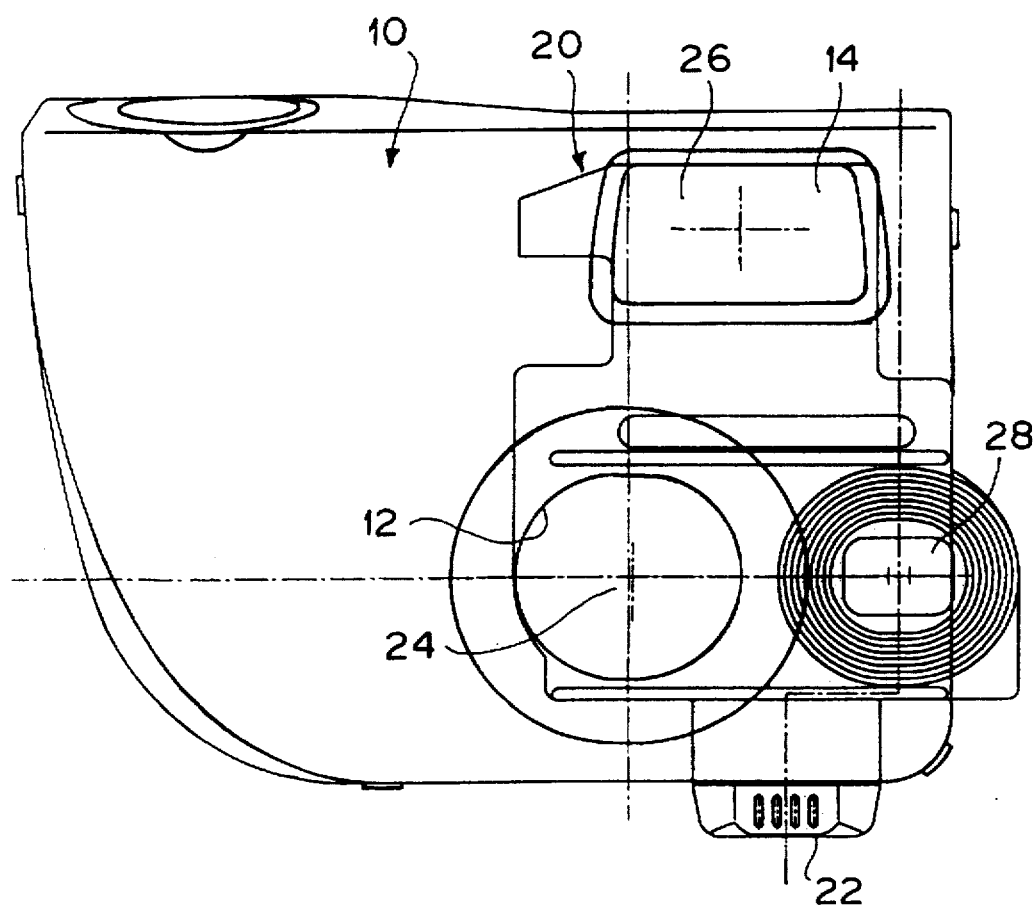
FIG. 4 is a view showing the relation of the front cover and the barrier when the barrier is in the closing position.
Figure 5:
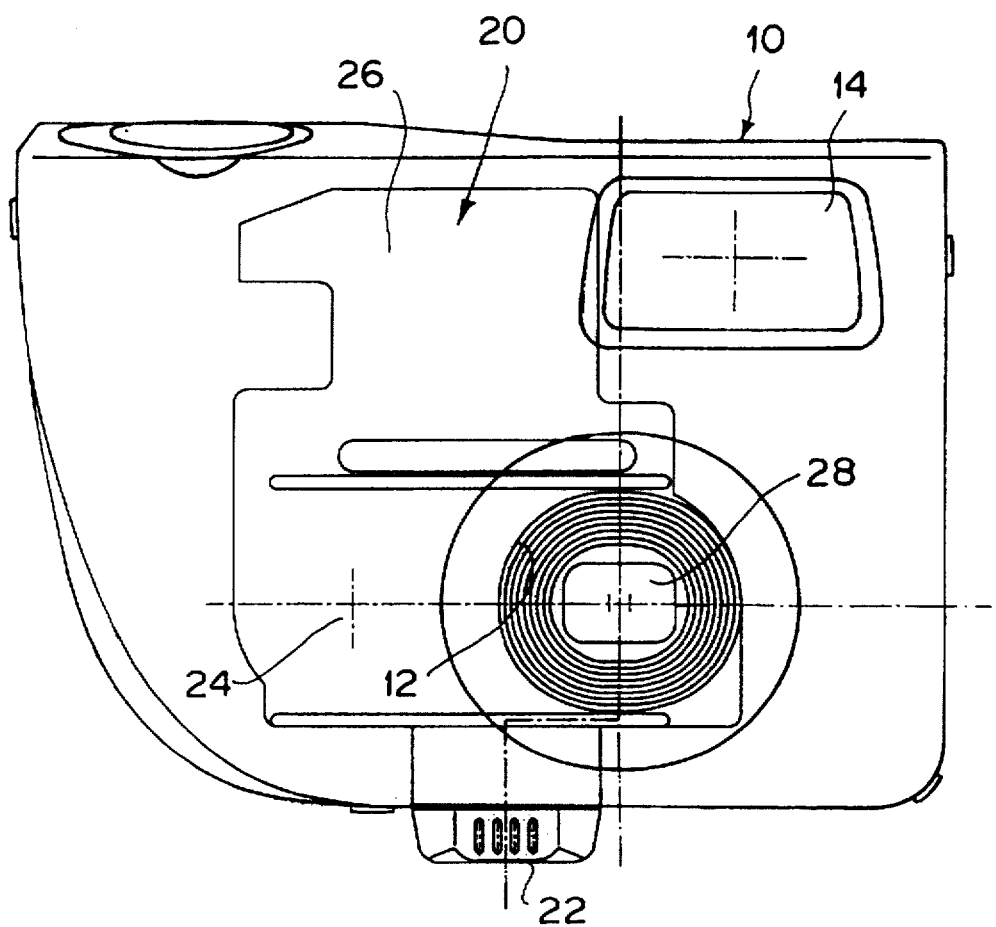
FIG. 5 is a view showing the relation of the front cover and the barrier when the barrier is in the opening position.

When the barrier 20 is in the closing position shown in FIG. 4, the first portion 24 of the barrier 20 is opposed to the larger opening 12 in the front cover 10 and the second portion 26 of the barrier 20 is opposed to the smaller opening 14 in the front cover 10, whereby the taking lens 4 and the viewfinder 6 are closed. When the barrier 20 is moved leftward to the opening position shown in FIG. 5 by operation of the knob 22, the opening 28 is brought into alignment with the opening 12 in the front cover 10 and the taking lens 4 and the cutaway portion in the barrier 20 is brought into alignment with the opening 14 in the front cover 10 and the viewfinder 6. Since the opening 28 in the barrier 20 is smaller than the opening 12 in the front cover 10, the anti-flare pattern 28a around the opening 28 is exposed through the opening 12 and reflects outward the peripheral portion of light entering through the opening 12 in the front cover 10. Thus the barrier 20 functions like a lens hood, whereby occurrence of flare can be effectively prevented.

Figure 6:
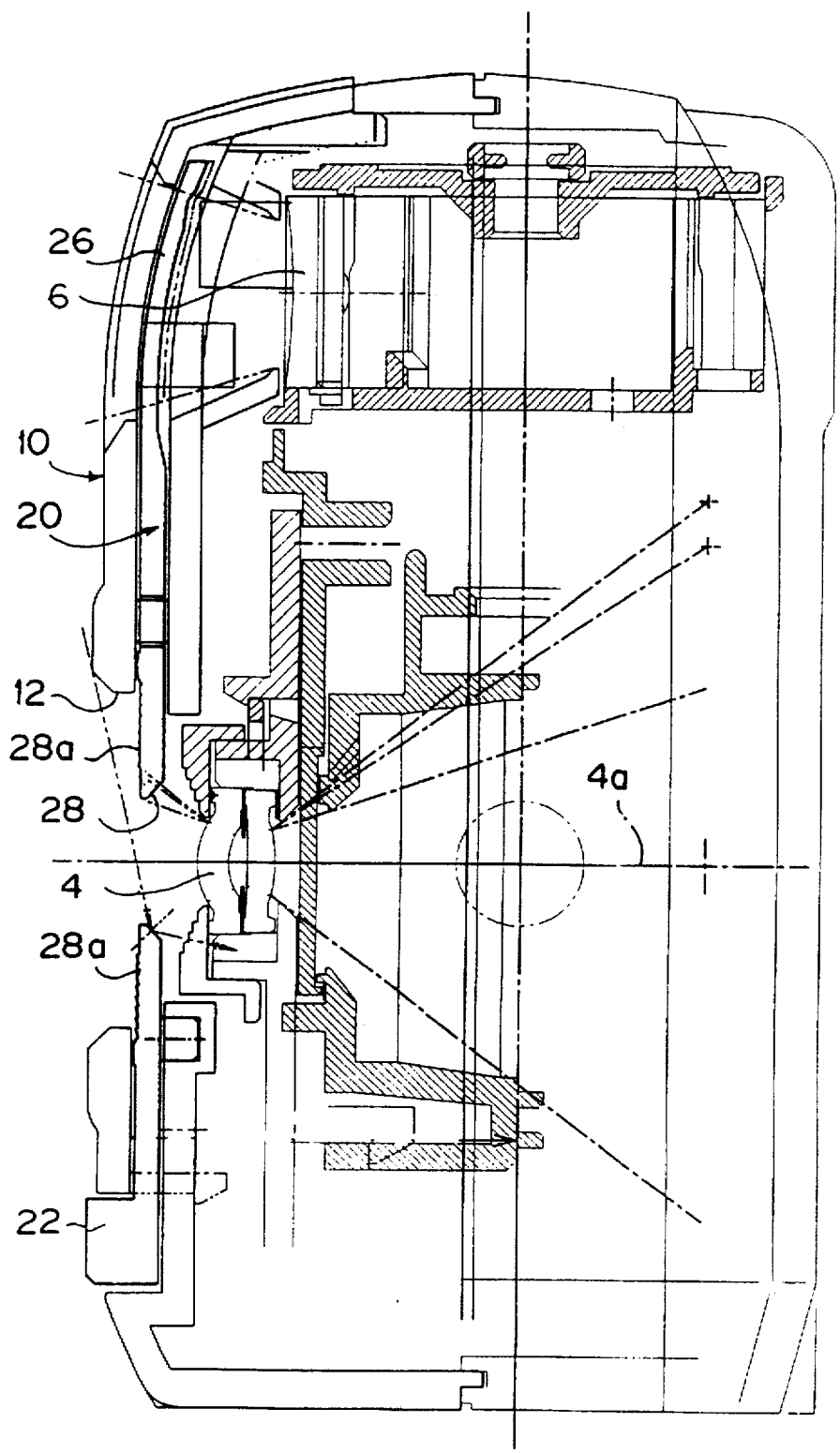
FIG. 6 is a cross-sectional view of the camera.

As clearly shown in FIG. 6, the opening 28 in the barrier 20 flares toward the taking lens 4, thereby preventing light rays entering through the opening 12 at a relatively large angle thereto from entering the taking lens 4. This enhances the anti-flare effect of the barrier 20.

Figure 7:
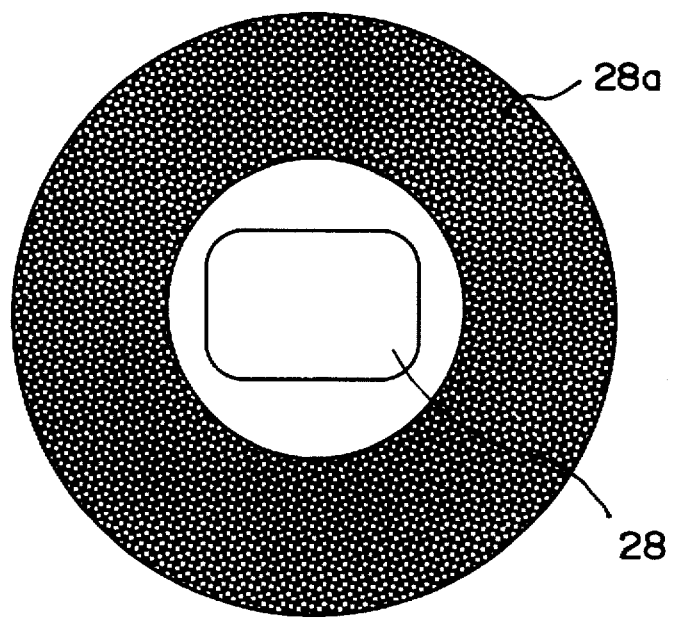
FIG. 7 is a view showing a satin finish anti-flare pattern according to the invention.

Then anti-flare pattern 28a around the opening 28 need not be limited to the illustrated pattern but may be a mosaic pattern, a satin pattern (as shown in FIG. 7) or the like.

What is claimed is:

1. A photographic camera having a barrier which is disposed between the camera body and a decorative front cover, said barrier movable between a closed position where it covers a taking lens of the camera and an open position where it exposes the taking lens through an opening formed in the front cover, characterized in that:

said barrier is provided with an opening which is brought into alignment with the taking lens and the opening in the front cover when the barrier is moved to the open position said opening of said barrier having a smaller diameter than the opening in the front cover, and an anti-flare pattern comprising recessed portions and protruding portions is formed on the outer surface of the barrier around the opening.

2. A photographic camera as defined in claim 1 in which said opening in the barrier flares toward the taking lens.

3. A photographic camera as defined in claim 1 wherein said anti-flare pattern comprises a plurality of alternating annular recessions and protrusions arranged concentrically with the opening of the barrier.

4. A photographic camera as defined in claim 1 wherein said anti-flare pattern comprises a mosaic pattern.

5. A photographic camera as defined in claim 1 wherein said anti-flare pattern comprises a satin pattern.

6. A photographic camera as defined in claim 1 wherein the barrier moves between the open and closed positions by sliding in a plane parallel to the front cover.

7. A photographic camera comprising:
- a camera body including a front housing with a lens opening therein;
- a camera operating mechanism in the camera body;
- an image forming lens mounted in the camera body, facing the front housing; and
- a barrier disposed between the image forming lens and the front housing and having a front surface facing the front housing, said barrier having an opening therein which is smaller than the lens opening in the front housing;
- barrier moving means for moving said barrier between a closed position where it covers the lens and an open position where the opening in the barrier is aligned with the image forming lens and the lens opening of the front housing to expose the lens;
- wherein said front surface of said barrier has an anti-flare pattern arranged around the opening of the barrier, such that in the open position said anti-flare pattern is exposed through the lens opening of the front housing to outwardly reflect a peripheral portion of light entering through the front housing to prevent flare.

8. A photographic camera as defined in claim 7 in which said opening in the barrier has a varying diameter which is greater at a point closer to the lens than at a point farther from the lens.

9. A photographic camera as defined in claim 7 wherein said anti-flare pattern comprises a plurality of alternating annular recessions and protrusions arranged concentrically with the opening of the barrier.

10. A photographic camera as defined in claim 7 wherein said anti-flare pattern comprises a satin pattern.

11. A photographic camera as defined in claim 7 wherein said barrier moving means comprises means for slidably holding the barrier in a plane parallel to the front cover so that the barrier slides between the open and closed positions within said plane.

12. A photographic camera having a barrier which is disposed between the camera body and a front cover, said barrier movable between a closed position where it covers a lens of the camera and an open position where it exposes the lens through an opening formed in the front cover, characterized in that:
- said barrier has an opening which is aligned with the taking lens and the opening in the front cover when the barrier is moved to the open position, said opening of said barrier having a smaller diameter than the opening in the front cover,
- wherein an anti-flare pattern comprising recessed portions and protruding portions is formed on the outer surface of the barrier around the opening, and said opening in the barrier has a varying diameter which is greater at a point closer to the lens than at a point farther from the lens.

13. A photographic camera as defined in claim 12 wherein said anti-flare pattern comprises a plurality of alternating annular recessions and protrusions arranged concentrically with the opening of the barrier.

14. A photographic camera as defined in claim 12 wherein said anti-flare pattern comprises a satin pattern.

15. A photographic camera as defined in claim 12 wherein the barrier moves between the open and closed positions by sliding in a plane parallel to the front cover.

* * * * *